United States Patent [19]

Miyabe et al.

[11] Patent Number: 5,057,397
[45] Date of Patent: Oct. 15, 1991

[54] ELECTRON BEAM-CURABLE RESIST COMPOSITION AND METHOD FOR FINE PATTERNING USING THE SAME

[75] Inventors: Masanori Miyabe, Fujisawa; Hidekatsu Kohara, Chigasaki; Toshimasa Nakayama, Hiratsuka, all of Japan

[73] Assignee: Tokyo Ohka Kogyo Co., Ltd., Kanagawa, Japan

[21] Appl. No.: 438,334

[22] Filed: Nov. 16, 1989

[30] Foreign Application Priority Data

Nov. 28, 1988 [JP] Japan ................................ 63-298335

[51] Int. Cl.$^5$ ............................................. G03F 7/038
[52] U.S. Cl. .................................. 430/270; 430/296; 430/920; 430/927; 430/942
[58] Field of Search ............... 430/270, 296, 920, 927, 430/942

[56] References Cited

U.S. PATENT DOCUMENTS 4,189,323  2/1980  Buhr .................................... 430/281

*Primary Examiner*—Charles L. Bowers, Jr.
*Assistant Examiner*—Janet C. Baxter
*Attorney, Agent, or Firm*—Wyatt, Gerber, Burke and Badie

[57] ABSTRACT

An electron beam-curable resist composition suitable for fine patterning works in the manufacturing process of semiconductor devices is proposed which is outstandingly stable in storage and capable of being developed using an aqueous alkaline developer solution without scums and giving a patterned resist layer with high contrast and orthogonal cross sectional profile of a line pattern. The composition comprises (A) a triazine compound, such as 2-(4-methoxyphenyl)-4,6-bis(trichloromethyl)-1,3,5-triazine, (B) a cresol novolac resin, of which at least 30% by weight of the phenolic moiety is derived from m-cresol, and (C) an alkoxymethylated melamine resin in specified proportions of (B):(C) and (A):[(B)+(C)]. The sensitivity of the resist composition is greatly enhanced by a heat treatment of the resist layer at 90°–140° C. after patternwise irradiation with electron beams.

5 Claims, 1 Drawing Sheet

ELECTRON BEAM-CURABLE RESIST COMPOSITION AND METHOD FOR FINE PATTERNING USING THE SAME

BACKGROUND OF THE INVENTION

The present invention relates to a novel electron beam-curable resist composition and a method for fine patterning using the same. More particularly, the invention relates to an electron beam-curable resist composition having excellent storage stability and capable of being developed with a developer solution containing an organic alkali compound without the trouble due to scum formation to give a patterned resist layer having an ideally orthogonal cross sectional profile of a line pattern with a high contrast of the images so as to be useful in the manufacturing process of various kinds of semiconductor devices such as transistors, ICs, LSIs, VLSIs and the like as well as to a method for forming a very finely patterned resist layer on a substrate surface by using the resist composition.

Semiconductor devices, such as transistors, ICs, LSIs, VLSIs and the like, are manufactured in a process usually involving a step of photolithography, in which a substrate, such as a semiconductor silicon wafer, is provided on the surface with a coating layer of a photosensitive resin composition and the photosensitive layer is exposed patternwise to light through a photomask bearing the image of a pattern followed by a development treatment and rinse treatment to form a patterned photoresist layer and an etching treatment or a dopant-diffusion treatment on the areas uncoated with the resist layer by repeating the above described procedure several times according to need so as to form an electronic circuit on the substrate surface.

It would be a due expectation in view of the trend in the semiconductor industry in recent years toward increasing fineness in the works of semiconductor processing that the density of integration in semiconductor memories will be upgraded to 16 MDRAMs, 64 MDRAMs, 256 MDRAMs, 1GDRAMs and even higher in the near future. This trend in the electronic industry requires finer and finer working in the photolithographic process of semiconductor processing giving rise to many proposals and attempts relative to improvements in the resist materials and exposure appratuses by minifying projection of light.

For example, it is an already established technology that a resist pattern having a line width of as fine as 0.4 to 0.5 $\mu$m can be obtained by the combined use of a positive-working photoresist composition comprising a specific novolac resin and a naphthoquinone diazide compound and a minifying projection exposure apparatus of high precision. It is, however, accepted that the uppermost limit of the working fineness has been or will shortly be reached even by such an improved method.

In recent years, on the other hand, demand is growing, among high-performance semiconductor devices, for application-specific ICs (ASICs) specifically designed to meet a particular application. Manufacture of ASICs unavoidably has a problem in respect of the production of a large number of different grades each in a relatively small quantity. This problem necessarily leads to a difficulty in preparing respective photomasks for the particular ASICs taking large costs and time to cause a serious delay of the product delivery and economical disadvantages.

In order to comply with the demand growth for ASICs by avoiding the above mentioned problems, it is a subject matter of intensive investigations in the electronics industry to directly effect patterning of a resist layer without using a photomask, for example, by a controlled scanning of electron beams on a resist layer formed from an electron beam-curable resist composition. This method of electron beam patterning is promising in respect of the highest fineness of patterning where a fineness of 0.5 $\mu$m or finer can be obtained relatively easily on the surface of a silicon wafer. It is essential in the electron beam patterning of a resist layer that the electron beam is narrowed down to have a very small diameter not exceeding 0.5 $\mu$m to obtain clear demarcation between adjacent patterned lines without overlapping. The electron beam-curable resist composition accordingly should meet several requirements that the contrast of the images obtained therewith is sufficiently high with a difference in the solubility as large as possible between the irradiated and unirradiated areas, that a line pattern obtained therefrom has a cross sectional profile as close as possible to complete orthogonality on the substrate surface, and so on.

It is a remarkable fact that a resist composition having excellent performance as a photoresist composition is not always excellent as an electron beam-curable resist composition. For example, the photosensitive resin composition useful for making a printing plate disclosed in U.S. Pat. No. 3,697,274, which comprises an amino resin, melamine resin and organic halogen compound, is not suitable as an electron beam-curable resist composition. Examples of electron beam-curable resist compositions hitherto developed include those comprising a poly(methyl methacrylate) resin disclosed in Japanese Patent Publication 45-30225, poly(glycidyl methacrylate) disclosed in Journal of Electrochemical Society, volume 118, page 669 (1971) and chloromethylated polystyrene disclosed in Japanese Patent Kokai 57-176034.

A problem in these electron beam-curable resist compositions in the prior art is that the developer used for the development treatment thereof is an organic solvent to cause environmental pollution and adverse influences on the workers' health even by setting aside their relatively poor performance as a resist material that scums are sometimes formed on the resist pattern after development and adjacent line patterns sometimes overlap on each other with poor resolution to affect the accuracy of the resist pattern, that the cross sectional profile of the line pattern obtained therefrom sometimes deviates from orthogonality and the contrast of the images obtained using them is sometimes too low.

On the other hand, a resist composition capable of being patterned by the irradiation with excimer lasers, far ultraviolet light and X-rays followed by development with an aqueous developer solution is disclosed in Japanese Patent Kokai 62-164045. The composition, which comprises a thermosetting resin and an organic halogen compound capable of absorbing chemical rays at a wavelength of 210 to 299 nm to act as a photolytic acid generator, is suggested to be sensitive also to electron beam irradiation. The fact is, however, that the patterned resist layer formed from such a composition by patternwise irradiation with electron beams has poor contrast of the images and the line pattern thus formed is far from orthogonality in the cross sectional profile sometimes having trailing skirts not to give high resolution of extremely fine patterns if not to mention the impractically poor storage stability of the resist composition in the form of a solution.

SUMMARY OF THE INVENTION

The present invention accordingly has an object to provide a novel and improved electron beam-curable resist composition free from the above described problems and disadvantages in the conventional electron beam-curable resist compositions, which has excellent storage stability and is capable of being developed with an aqueous developer solution containing an organic alkaline compound without the troubles due to scum formation to give a patterned resist layer having an ideally orthogonal cross sectional profile of a line pattern with a high contrast of the images so as to be useful for fine patterning works in the manufacturing process of various kinds of semiconductor devices. The invention also has an object to provide a method for patterning a resist layer by using the electron beam-curable resist composition.

Thus, the electron beam-curable resist composition of the invention comprises, as a uniform mixture dissolved in an organic solvent:

(A) a 1,3,5-triazine compound represented by the general formula

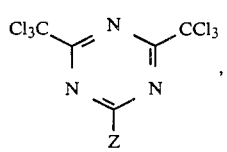

in which Z is a 4-alkoxy-substituted phenyl group of the general formula

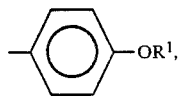

$R^1$ being an alkyl group having 1 to 5 carbon atoms, or a 4-alkoxy-substituted α-naphthyl group of the general formula

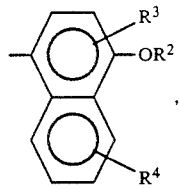

$R^2$ being an alkyl group having 1 to 5 carbon atoms and $R^3$ and $R^4$ being, each independently from the other, a hydrogen atom, hydroxy group or carboxyl group;

(B) a cresol novolac resin, in which at least 30% by weight of the cresol moiety is derived from m-cresol; and (C) an alkoxymethylated melamine resin, in which the amount of the component (A) is in the range from 2 to 10% by weight based on the total amount of the components (B) and (C) and the weight ratio of the component (B) to the component (C) is in the range from 60:40 to 95:5.

The method of the present invention for patterning a resist layer by using the above defined electron beam-curable resist composition comprises the steps of:

(a) coating a substrate surface with the resist composition and drying to form a uniform electron beam-sensitive resist layer;

(b) irradiating the electron beam-sensitive resist layer patternwise with electron beams to form a latent image;

(c) heating the resist layer having the latent image at a temperature in the range from 90° to 140° C. to effect sensitization of the latent image; and (d) developing the thus sensitized latent image with an aqueous solution of an organic alkaline compound.

BRIEF DESCRIPTION OF THE DRAWING

The figures each schematically illustrate a cross sectional profile of line patterns obtained by using the resist compositions prepared in the Examples and Comparative Examples, of which

DETAILED DESCRIPTION OF THE PREFERRED EMBODIMENTS

Figure 1:
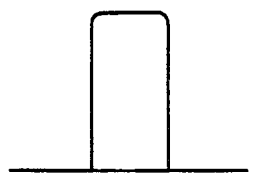
FIG. 1 is for an orthogonal cross section.

The 1,3,5-triazine compound as the component (A) in the inventive resist composition is a compound having two trichloromethyl groups in a molecule as represented by the general structural formula (I) given above, in which the symbol Z has the meaning as defined. Examples of such a triazine compound include: 2-(4-methoxyphenyl)-4,6-bis-(trichloromethyl)-1,3,5-triazine; 2-(4-ethoxyphenyl)-4,6-bis(trichloromethyl)-1,3,5-triazine; 2-(4-propoxyphenyl)-4,6-bis(trichloromethyl)-1,3,5-triazine; 2-(4-butoxyphenyl)-4,6-bis(trichloromethyl)-1,3,5-triazine; 2-(4-methoxy-α-naphthyl)-4,6-bis(trichloromethyl)-1,3,5-triazine; 2-(4-ethoxy-α-naphthyl)-4,6-bis(trichloromethyl)-1,3,5-triazine; 2-(4-propoxy-α-naphthyl)-4,6-bis(trichloromethyl)-1,3,5-triazine; 2-(4-butoxy-α-naphthyl)-4,6-bis(trichloromethyl)-1,3,5-triazine and the like. These triazine compounds can be used either singly or as a combination of two kinds or more according to need.

The triazine compound having a trichloromethyl group as the substituent on the triazine ring is a known compound as a photopolymerization initiator in a photopolymerizable composition comprising a monomeric compound having an ethylenically unsaturated group in the molecule according to the disclosure in Japanese patent Kokai 62-212401. Nothing, however, is suggested there and anywhere else that such a specific compound can be an ingredient in an electron beam-curable resist composition.

The component (B) in the inventive resist composition is a cresol novolac resin in which at least 30% by weight of the phenolic moiety is derived from m-cresol. Although the type of the rest of the phenolic moiety is not limitative including those derived from other cresol isomers and xylenols, it is preferable that the cresol novolac resin is prepared from a phenolic mixture composed of at least 30% by weight of m-cresol, the rest being selected from the group consisting of p-cresol, 2,5-xylenol and 3,5-xylenol or, more preferably, from a phenolic mixture composed of from 55 to 75% by weight of m-cresol and from 45 to 25% by weight of either one or a combination of p-cresol and 3,5-xylenol.

The above defined specific cresol novolac resin is effective to impart excellent heat resistance to the patterned resist layer formed from the inventive resist composition and orthogonality to the cross sectional profile of a line pattern of the resist formed on a substrate surface.

The above described cresol novolac resin can be prepared according to a known procedure for the preparation of conventional cresol novolac resins by the polycondensation reaction of a phenolic mixture composed of the above named phenolic compounds each in a specified proportion in the presence of formaldehyde and an acid catalyst. The cresol novolac resin as the component (B) should have a weight-average molecular weight in the range from 2000 to 20,000 or, preferably, from 3000 to 15,000 so that the contrast of the patterned images can be improved as a consequence of the increased difference in the solubility of the composition in the developer solution between the areas irradiated and unirradiated with electron beams.

The component (C) in the inventive resist composition is an alkoxymethylated melamine resin which is obtained by the alkoxylation of the methyl groups in a conventional methylolated melamine into alkoxymethyl groups. On an average, at least 2.5 or, preferably, at least 3.5 methylol groups in a molecule of the methylolated melamine should be converted into alkoxymethyl groups so as to greatly improve the storage stability of the inventive resist composition in the form of an organic solution. The type of the alkoxymethyl groups is not particularly limitative including methoxymethyl, ethoxymethyl, propoxymethyl and butoxymethyl groups. Several grades of alkoxymethylated melamine resins are commercially available and can be used as such as the component (C) in the inventive composition including those sold under the tradenames of, for example, Nicalacs Mx-750, Mx-032. Mx-705, Mx-708, Mx-40, Mx-31. Ms-11. Mw-22 and Mw-30 manufactured by Sanwa Chemical Co. These alkoxymethylated melamine resins can be used either singly or as a combination of two kinds or more according to need.

As to the compounding proportion of the cresol novolac resin as the component (B) and the alkoxymethylated melamine resin as the component (C), the weight ratio of the component (B) to the component (C) should be in the range from 60:40 to 95:5 or, preferably, from 75:25 to 90:10. When the compounding proportion of the components (B) and (C) is outside the above mentioned range, disadvantages may be caused in the scum formation on the patterned resist layer after development and a decrease in the contrast of the patterned images due to the non-orthogonality of the cross sectional profiles of the line pattern formed from the resist composition in addition to an eventual decrease in the storage stability of the resist composition in the form of a solution.

The triazine compound as the component (A) is compounded in the inventive resist composition in an amount in the range from 2 to 10% by weight or, preferably, from 3 to 7% by weight based on the total amount of the cresol novolac resin as the component (B) and the alkoxymethylated melamine resin as the component (C). When the amount thereof is outside of the above mentioned range, certain disadvantages, such as a decrease in the contrast of the patterned images, are caused in the patterned resist layer formed from the composition.

The electron beam-curable resist composition of the invention is prepared by dissolving the components (A), (B) and (C) in an organic solvent to give a solution used in the coating works on a substrate surface. Examples of suitable organic solvents include ketones, e.g., acetone, methyl ethyl ketone, cyclohexanone and methyl isoamyl ketone, polyhydric alcohols and derivatives thereof, e.g., ethylene glycol, propylene glycol, ethylene glycol monoacetate, diethylene glycol and monomethyl, monopropyl, monobutyl and monophenyl ethers of diethylene glycol, cyclic ether compounds, e.g., dioxane, ester compounds, e.g., methyl acetate, ethyl acetate, butyl acetate and ethyl lactate, and the like. These organic solvents can be used either singly or as a mixture of two kinds or more according to need. The concentration of the non-volatile matter in the solution is not particularly limitative depending on the desired thickness of the resist layer formed on the substrate surface and the available coating method.

It is of course optional that the inventive resist composition is admixed with various kinds of known additives having compatibility with the essential ingredients each in a limited amount including, for example, auxiliary resins, plasticizers, stabilizers, dyes as a halation inhibitor, coloring agents to enhance visibility of the patterned resist layer after development and so on.

Following is a description of the method for forming a finely patterned resist layer by using the electron beam-curable resist composition prepared in the above described manner. First, a substrate such as a semiconductor wafer is coated with the inventive resist composition by using a suitable coating machine such as a spinner followed by drying to give an electron beam-sensitive coating layer of the resist composition on the surface. The resist layer is then irradiated patternwise with electron beams in a dose of, for example, 2 to 20 $\mu C/cm^2$ to form a latent image of a desired pattern and subsequently subjected to a heat treatment at a temperature in the range from 90° to 140° C. for a length of time in the range from 30 to 300 seconds to effect sensitization of the latent image. Thereafter, a development treatment of the thus sensitized latent image in the resist layer is performed with a developer solution which is an aqueous solution of an organic alkaline compound such as tetramethyl ammonium hydroxide, choline and the like so as to selectively dissolve away the resist composition on the areas of the resist layer unirradiated with the electron beams leaving a patterned resist layer having excellent contrast of the patterned images and satisfactorily orthogonal cross sectional profile of the line pattern.

The heat treatment subsequent to the patternwise irradiation with electron beams has an effect to enhance the sensitivity of the latent images in the development treatment and is essential in practicing the method of the invention. When the temperature of this heat treatment is too low, the above mentioned improvement in the sensitivity cannot be obtained. When the temperature is too high, on the other hand, certain adverse influences are caused in the resolving power of the latent images eventually to cause contacting or overlapping of adjacent line patterns so that the contrast in the patterned images is greatly decreased.

It is of course that the type of the actinic rays for patterning of the inventive resist composition is not limited to electron beams but other types of actinic rays can also be used including ultraviolet light, far-ultraviolet light, X-rays and the like.

To summarize, the electron beam-curable resist composition of the invention is advantageous in several respects including the high storage stability even in the form of a solution without the problems of changes in the sensitivity or formation of precipitates after a long period of storage, very high contrast of the patterned images and orthogonality of the cross sectional profile of a line pattern formed therefrom and developability with an aqueous developer solution without the problems of environmental pollution and adverse influences on the workers' health. Therefore, the inventive electron beam-curable resist composition is useful in the manufacturing process of various kinds of finely processed electronic devices such as VLSIs and the like.

In the following, the electron beam-curable resist composition and the patterning method of a resist layer using the same according to the invention are described in more detail by way of examples. In the following examples, the inventive resist compositions and the results of patterning therewith were evaluated for the following items.

(1) Sensitivity to electron beam irradiation: the sensitivity was given in terms of the irradiation dose in $\mu C/cm^2$ to give a 80% residual film ratio on the electron beam-irradiated areas.

(2) Residual film ratio: the ratio was calculated as a ratio of the film thickness after the development treatment to the thickness before development.

Figure 2:
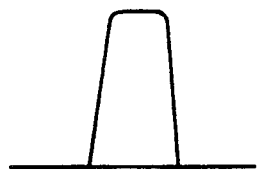
FIG. 2 is for a downwardly broadened trapezoidal cross section and FIG. 3 is for a trapezoidal cross section having trailing skirts.
Figure 3:
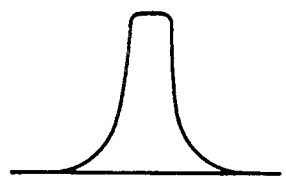

(3) Cross sectional profile of a line pattern: the profiles found by the electron-microscopic examination were classified into three types of (a), (b) and (c) shown on FIGS. 1, 2 and 3, respectively, of the accompanying drawings corresponding to an orthogonal cross section though with somewhat rounded shoulders, trapezoidal cross section without trailing skirts and trapezoidal cross section with trailing skirts, respectively.

(4) Scum formation: the patterned resist layer after development was examined with an electron microscope to record the results with the symbols A and B for complete absence of scums and appearance of clearly noticeable scums, respectively.

(5) Storage stability of resist solution: the resist solution kept standing for 3 months at room temperature was examined visually and by the test for the sensitivity to record the results with the symbols of A and B for the complete absence of any changes and noticeable changes relative to the appearance of precipitates and decrease in the sensitivity, respectively.

EXAMPLE 1

A cresol novolac resin having a weight-average molecular weight of about 6000 was prepared in a conventional procedure from a 60:40 by weight mixture of m- and p-cresols and formalin by using oxalic acid as the condensation catalyst. A resist composition in the form of a solution was prepared by dissolving 4 g of the above prepared cresol novolac resin and 1 g of a methoxymethylated melamine resin having an average degree of methoxymethylation of 3.5 (Nicalac Mx-750, a product by Sanwa Chemical Co.) in 15 g of ethyl lactate and admixing the thus obtained solution with 2-(4-methoxyphenyl)-4,6-bis(trichloromethyl)-1,3,5-triazine in an amount of 3% by weight based on the total amount of the cresol novolac resin and the methoxymethylated melamine resin followed by filtration under pressurization through a membrane filter having a pore diameter of 0.2 $\mu m$.

The thus prepared resist solution was applied to the surface of a 4-inch silicon wafer after a surface treatment with hexamethyl disilazane on a spinner rotating at 4000 rpm for 20 seconds followed by drying for 90 seconds on a hot plate at 80° C. to give a resist layer having a thickness of 500 nm on the substrate surface. The resist layer was then subjected to patternwise irradiation with electron beams accelerated at a voltage of 20 kV to give a specified irradiation dose using an electron beam irradiation apparatus (Model HHS-2R, manufactured by Hitachi Ltd.) and, after a heat treatment at 110° C. for 90 seconds in an oven, developed by immersing in an aqueous developer solution containing 2.38% by weight of tetramethyl ammonium hydroxide at 23° C. for 120 seconds to selectively dissolve away the resist composition on the areas unirradiated with the electron beams. The thus obtained patterned resist layer had a residual film ratio of at least 90% in most of the patterned areas with excellent contrast of the images. The cross sectional profile of a line pattern having a width of 0.35 $\mu m$ had good orthogonality classified in type (a). No contacting or overlapping of the adjacent line patterns was found at all. The sensitivity was 8 $\mu C/cm^2$. The patterned resist layer had excellent heat stability according to the test by heating the silicon wafer for 30 minutes on a hot plate at 200° C. to find no noticeable changes in the cross sectional profile of the line pattern. The storage stability of the resist solution was excellent to be rated in A according to the criteria given above.

EXAMPLES 2 to 23

The experimental procedure in each of these Examples was substantially the same as in Example 1 excepting modifications in the composition of the phenolic compounds from which the novolac resin was prepared and weight-average molecular weight of the novolac resin as shown in Table 1 below and the type of the alkoxymethylated melamine resin, compounding weight ratio [(B):(C)] of the novolac resin to the alkoxymethylated melamine resin, type of the triazine compound and amount thereof in % by weight relative to the total amount of the novolac resin and the alkoxymethylated melamine resin as shown in Table 2 below.

In Table 2, the types of the alkoxymethylated melamine resins are noted as C-I, C-II and C-III for the same resin as used in Example 1, another methoxymethylated melamine resin having an average degree of methoxymethylation of 2.5 (Nicalac Mx-032, a product by the same produced as Nicalac Mx-750) and a third methoxymethylated melamine resin having an average degree of methoxymethylation of 5.5 (Nicalac Mw-30, a product by the same produced as Nicalac Mx-750), respectively, and the types of the triazine compounds are noted as A-I, A-II and A-III for the same triazine compound as used in Example 1, 2-(4-methoxy-α-naphthyl)-4,6-bis(trichloromethyl)-1,3,5-triazine and 2-(4-butoxy-α-naphthyl)-4,6-bis(trichloromethyl)-1,3,5-triazine, respectively.

TABLE 1

| Example No. | Phenolic mixture, % by weight | | | | Molecular weight |
|---|---|---|---|---|---|
| | m-cresol | p-cresol | 3,5-xylenol | 2,5-xylenol | |
| 2 | 60 | 40 | — | — | 5000 |
| 3 | 60 | 40 | — | — | 9000 |
| 4 | 60 | 40 | — | — | 15000 |
| 5 | 60 | 40 | — | — | 20000 |
| 6 | 60 | — | 40 | — | 3500 |
| 7 | 60 | — | 40 | — | 3500 |
| 8 | 60 | — | 40 | — | 3500 |
| 9 | 60 | — | 40 | — | 5300 |

TABLE 1-continued

| Exam-ple No. | Phenolic mixture, % by weight | | | | Mole cular weight |
|---|---|---|---|---|---|
| | m-cresol | p-cresol | 3,5-xy-lenol | 2,5-xy-lenol | |
| 10 | 70 | — | 30 | — | 5800 |
| 11 | 70 | — | 30 | — | 7400 |
| 12 | 60 | — | 40 | — | 3500 |
| 13 | 60 | — | 40 | — | 3500 |
| 14 | 60 | — | 40 | — | 3500 |
| 15 | 60 | — | 40 | — | 3500 |
| 16 | 40 | 60 | — | — | 9000 |
| 17 | 70 | 30 | — | — | 7700 |
| 18 | 100 | — | — | — | 4200 |
| 19 | 35 | 35 | — | 30 | 5800 |
| 20 | 70 | 30 | — | — | 7700 |
| 21 | 70 | 30 | — | — | 7700 |
| 22 | 40 | 60 | — | — | 4000 |
| 23 | 40 | 60 | — | — | 4000 |

TABLE 2

| Example No. | Alkoxymethylated melamine resin | (B):(C) | Triazine compound (% by weight) |
|---|---|---|---|
| 2 | C-I | 90:10 | A-I (3) |
| 3 | C-I | 90:10 | A-I (3) |
| 4 | C-I | 90:10 | A-I (3) |
| 5 | C-I | 90:10 | A-I (3) |
| 6 | C-I | 90:10 | A-I (3) |
| 7 | C-I | 80:20 | A-I (3) |
| 8 | C-I | 60:40 | A-I (3) |
| 9 | C-I | 90:10 | A-I (3) |
| 10 | C-I | 90:10 | A-I (3) |
| 11 | C-I | 90:10 | A-I (3) |
| 12 | C-I | 90:10 | A-II (3) |
| 13 | C-I | 80:20 | A-II (3) |
| 14 | C-II | 90:10 | A-I (3) |
| 15 | C-I | 90:10 | A-III (7) |
| 16 | C-I | 80:20 | A-I (3) |
| 17 | C-I | 90:10 | A-I (3) |
| 18 | C-I | 90:10 | A-I (3) |
| 19 | C-I | 80:20 | A-I (3) |
| 20 | C-III | 80:20 | A-I (3) |
| 21 | C-III | 90:10 | A-I (3) |
| 22 | C-III | 80:20 | A-I (3) |
| 23 | C-III | 90:10 | A-I (3) |

Table 3 below summarizes the results of the evaluation tests of the resist compositions in these Examples.

TABLE 3

| | Sensitivity, μC/cm² | Residual film ratio, % | Cross sectional profile | Scum formation | Storage stability |
|---|---|---|---|---|---|
| Example | | | | | |
| 2 | 9.2 | 90 | a | A | A |
| 3 | 4.2 | 94 | a | A | A |
| 4 | 2.4 | 94 | a | A | A |
| 5 | 2.4 | 94 | b | A | A |
| 6 | 5.6 | 91 | a | A | A |
| 7 | 5.2 | 91 | a | A | A |
| 8 | 7.0 | 87 | a | A | A |
| 9 | 4.4 | 94 | a | A | A |
| 10 | 6.0 | 92 | a | A | A |
| 11 | 5.2 | 93 | a | A | A |
| 12 | 4.6 | 90 | a | A | A |
| 13 | 5.2 | 90 | a | A | A |
| 14 | 10.2 | 80 | b | A | A |
| 15 | 2.0 | 94 | b | A | A |
| 16 | 3.4 | 91 | a | A | A |
| 17 | 5.8 | 92 | a | A | A |
| 18 | 9.2 | 90 | a | A | A |
| 19 | 8.9 | 87 | a | A | A |
| 20 | 2.0 | 94 | b | A | A |
| 21 | 3.0 | 94 | b | A | A |
| 22 | 4.0 | 92 | b | A | A |
| 23 | 5.0 | 92 | b | A | A |
| Comparative | | | | | |

TABLE 3-continued

| | Sensitivity, μC/cm² | Residual film ratio, % | Cross sectional profile | Scum formation | Storage stability |
|---|---|---|---|---|---|
| Example | | | | | |
| 1 | 2.0 | 90 | c | B | B |
| 2 | 1.0 | 90 | c | B | A |
| 3 | 40 | 90 | c | B | A |
| 4 | 2.0 | 94 | c | A | B |
| 5 | 2.4 | 94 | c | A | A |
| 6 | 3.0 | 90 | c | B | B |
| 7 | 2.4 | 90 | c | B | B |

COMPARATIVE EXAMPLES 1 to 4

Four different electron beam-curable resist compositions were used in the patterning test performed in the same manner as in Example 1 including a composition comprising a poly(glycidyl methacrylate) having a molecular weight of 90,000 (Comparative Example 1), a composition comprising a chloromethylated polystyrene having a molecular weight of 100,000 (Comparative Example 2), a commercially available electron beam-curable resist composition comprising a poly(vinyl phenol) resin and a bisdiazide compound (RD 2000N, a product by Hitachi Chemical Co.) (Comparative Example 3) and a resist composition prepared according to the disclosure in Example 1 of Japanese Patent Kokai 62-164045 (Comparative Example 4). The results of the evaluation tests are summarized in Table 3 from which it is evident that each of these comparative resist compositions is inferior to the inventive resist compositions in one or more respects.

COMPARATIVE EXAMPLES 5 to 7

The experimental procedure in each of these comparative examples was substantially the same as in Example 1 except that the cresol novolac resin was replaced with another cresol novolac resin having a weight-average molecular weight of about 6000 prepared from a 25:75 by weight mixture of m- and p-cresols (Comparative Example 5), except that the compounding ratio of the cresol novolac resin and the alkoxymethylated melamine resin was 50:50 by weight (Comparative Example 5) and except that the triazine compound was omitted (Comparative Example 7). The results of the evaluation tests are also shown in Table 3.

COMPARATIVE EXAMPLE 8

The experimental procedure was substantially the same as in Example 1 excepting omission of the heat treatment after the patternwise irradiation with electron beams. The quality of the patterned resist layer was as satisfactory as in Example 1 but the sensitivity at a 80% residual film ratio was about 100 μC/cm².

What is claimed is:

1. An electron beam-curable resist composition which comprises, as a uniform mixture dissolved in an organic solvent:

(A) a 1,3,5-triazine compound represented by the general formula

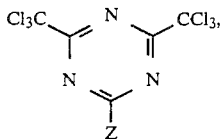

in which Z is a 4-alkoxy-substituted phenyl group of the general formula

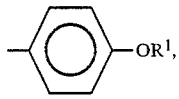

$R^1$ being an alkyl group having 1 to 5 carbon atoms, or a 4-alkoxy-substituted α-naphthyl group of the general formula

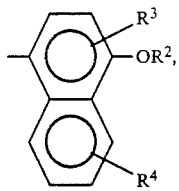

$R^2$ being an alkyl group having 1 to 5 carbon atoms and $R^3$ and $R^4$ being, each independently from the other, a hydrogen atom, hydroxy group or carboxyl group;

(B) a cresol novolac resin, in which at least 30% by weight of the cresol moiety is derived from m-cresol; and (C) an alkoxymethylated melamine resin, in which the amount of the component (A) is in the range from 2 to 10% by weight based on the total amount of the components (B) and (C) and the weight ratio of the component (B) to the component (C) is in the range from 60:40 to 95:5.

2. The electron beam-curable resist composition as claimed in claim 1 wherein the phenolic moieties in the cresol novolac resin as the component (B) comprises at least 30% by weight of m-cresol moiety, the balance being selected from the moieties of p-cresol, 2,5-xylenol and 3,5-xylenol.

3. The electron beam-curable resist composition as claimed in claim 2 wherein the phenolic moieties in the cresol novolac resin as the component (B) comprises from 55 to 75% by weight of m-cresol moiety, the balance being selected from the moieties of p-cresol and 3,5-xylenol.

4. The electron beam-curable resist composition as claimed in claim 1 wherein the average degree of alkoxymethylation of the alkoxymethylated melamine resin is at least 2.5.

5. The electron beam-curable resist composition as claimed in claim 1 wherein the cresol novolac resin as the component (B) has a weight-average molecular weight in the range from 2000 to 20000.

* * * * *